(12) United States Patent
Cummins et al.

(10) Patent No.: US 8,511,976 B2
(45) Date of Patent: Aug. 20, 2013

(54) TURBINE SEAL SYSTEM

(75) Inventors: Josef Scott Cummins, Simpsonville, SC (US); Ian David Wilson, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 469 days.

(21) Appl. No.: 12/848,906

(22) Filed: Aug. 2, 2010

(65) Prior Publication Data
US 2012/0027584 A1 Feb. 2, 2012

(51) Int. Cl.
*F01D 11/02* (2006.01)
*F01D 5/06* (2006.01)
(52) U.S. Cl.
USPC .............. 415/173.7; 415/199.5; 416/220 R
(58) Field of Classification Search
USPC ............................................ 415/173.1, 173.7
See application file for complete search history.

(56) References Cited

U.S. PATENT DOCUMENTS

| | | | |
|---|---|---|---|
| 2,623,357 A | 12/1952 | Birmann | |
| 2,656,147 A * | 10/1953 | Brownhill et al. | 416/97 R |
| 2,948,060 A | 12/1960 | Engelberger | |
| 3,258,067 A | 6/1966 | Fleur | |
| 3,433,020 A | 3/1969 | Earle, Jr. et al. | |
| 4,668,167 A * | 5/1987 | Le Maoŭt et al. | 416/95 |
| 4,820,119 A | 4/1989 | Joyce | |
| 5,236,302 A | 8/1993 | Weisgerber et al. | |
| 5,275,534 A | 1/1994 | Cameron et al. | |
| 5,288,210 A | 2/1994 | Albrecht et al. | |
| 5,318,405 A | 6/1994 | Meade et al. | |
| 5,338,154 A | 8/1994 | Meade et al. | |
| 5,472,313 A | 12/1995 | Quinones et al. | |
| 5,535,585 A | 7/1996 | Eichhom | |
| 5,630,703 A * | 5/1997 | Hendley et al. | 416/95 |
| 5,758,487 A * | 6/1998 | Salt et al. | 60/806 |
| 6,267,553 B1 | 7/2001 | Burge | |
| 6,899,520 B2 | 5/2005 | Habedank et al. | |

FOREIGN PATENT DOCUMENTS
GB 2280478 * 1/1995

OTHER PUBLICATIONS

GE Aero Energy; LM2500+ Marine Gas Turbine; prior art (2 pages).

* cited by examiner

*Primary Examiner* — Nathaniel Wiehe
*Assistant Examiner* — Brian O Peters
(74) *Attorney, Agent, or Firm* — Fletcher Yoder, P.C.

(57) ABSTRACT

In accordance with one embodiment, a system includes a multi-stage turbine including a first turbine stage including a first wheel having multiple first slots spaced circumferentially about the first wheel, and multiple first blade segments each coupled to at least one of the multiple first slots. The multi-stage turbine also includes a second turbine stage including a second wheel having multiple second slots spaced circumferentially about the second wheel, and multiple second blade segments each coupled to at least one of the multiple second slots. The multi-stage turbine further includes a one-piece interstage seal extending axially between the first and second turbine stages, wherein the one-piece interstage seal comprises a first radial support coupled to the first wheel and a second radial support coupled to the second wheel, and the one-piece interstage seal extends circumferentially across at least two of the multiple first slots or at least two of the multiple second slots.

18 Claims, 5 Drawing Sheets

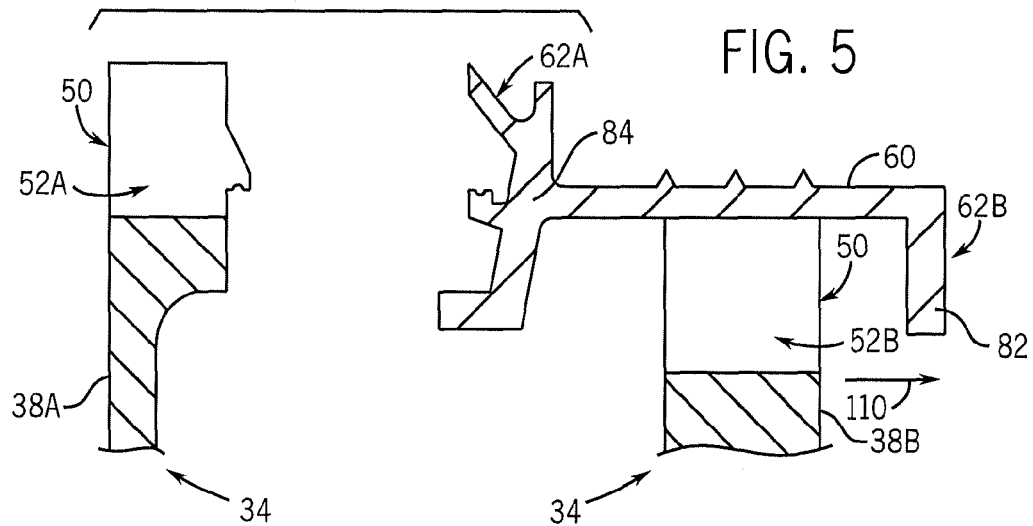
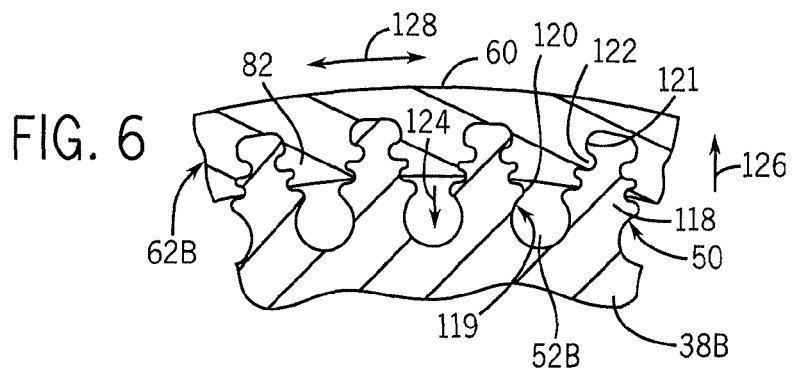
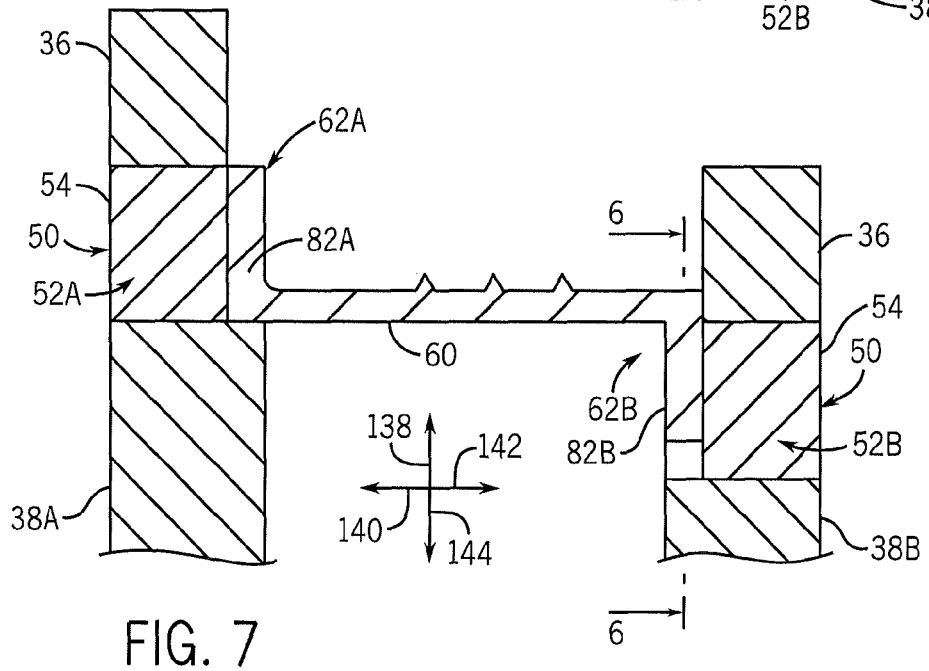

TURBINE SEAL SYSTEM

BACKGROUND OF THE INVENTION

The subject matter disclosed herein relates to gas turbines, and more specifically, to seals within turbines.

In general, gas turbine engines combust a mixture of compressed air and fuel to produce hot combustion gases. The combustion gases may flow through one or more turbine stages to generate power for a load and/or compressor. A pressure drop may occur between stages, which may allow flow of a fluid, such as combustion gases, through unintended paths. Seals may be disposed between the stages to reduce fluid leakage between stages. Unfortunately, the seals may be subject to stresses, such as thermal stresses, which may bias the seals in axial and/or radial directions thereby reducing effectiveness of the seals. For example, seal deflection may increase the possibility of a rub condition between stationary and rotating components.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a multi-stage turbine. The multi-stage turbine includes a first turbine stage including a first wheel having multiple first slots spaced circumferentially about the first wheel, and multiple first blade segments each coupled to at least one of the first slots. The multi-stage turbine also includes a second turbine stage including a second wheel having multiple second slots spaced circumferentially about the second wheel, and multiple second blade segments each coupled to at least one of the second slots. The multi-stage turbine further includes a one-piece interstage seal extending axially between the first and second turbine stages, wherein the one-piece interstage seal comprises a first radial support coupled to the first wheel and a second radial support coupled to the second wheel, and the one-piece interstage seal extends circumferentially across at least two of the multiple first slots or at least two of the multiple second slots.

In accordance with a second embodiment, a system includes a one-piece interstage turbine seal configured to mount axially between first and second turbine stages, wherein the one-piece interstage turbine seal includes a first radial support configured to couple with a first wheel of the first turbine stage and a second radial support configured to couple with a second wheel of the second turbine stage, the first radial support includes multiple first radial support protrusions circumferentially offset from one another, and each first radial support protrusion is configured to couple with one of multiple first slots in the first wheel to block movement of the one-piece interstage turbine seal in a radial direction.

In a third embodiment, a system includes a multi-stage turbine. The multi-stage turbine includes a first turbine stage including a first wheel having multiple first slots spaced circumferentially about the first wheel, and multiple first blade segments each coupled to at least one of the multiple first slots, wherein the multiple first slots include a first lower radius and a first upper radius. The multi-stage turbine includes a second turbine stage including a second wheel having multiple second slots spaced circumferentially about the second wheel, and multiple second blade segments each coupled to at least one of the multiple second slots, wherein the multiple second slots include a second lower radius and a second upper radius. The multi-stage turbine further includes an interstage seal extending axially between the first and second turbine stages, wherein the interstage seal includes a first radial support coupled to the first wheel, a second radial support coupled to the second wheel, and a wall extending between the first and second turbine stages, the wall has an inner radius that is greater than or equal to both the first and second lower radii, and the inner radius is greater than or equal to at least one of the first or second upper radii.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 5 is a partial cross-sectional side view of the gas turbine engine of FIG. 2 with a seal structure being removed from adjacent stages;

FIG. 6 is a partial cross-sectional view of an embodiment of radial support protrusions inserted in slots of a wheel of a turbine engine, taken along line 6-6 of FIG. 3;

FIG. 7 is a cross-sectional side view of a portion of the gas turbine engine of FIG. 2 illustrating another embodiment of the seal structure between turbine stages;

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to gas turbine engines that include interstage seals, wherein each interstage seal includes features to reduce the stresses along the axial facing surface of the seal, to minimize radial deflection of the seal, and to thermally stabilize the seal. In addition, these features increase the surface area of turbine wheels exposed to cooling air, thereby increasing the strength of the wheel. For example, the interstage seal may be completely supported during operation by adjacent turbine wheels via radial supports of the seal coupled to the wheels. The wheels may include slots for the radial supports of the seal, as well as abutments, to block movement of the seals in radial and axial directions. The radial supports may include dovetail protrusions or axial support protrusions. Also, the interstage seal may form a single piece that extends circumferentially across the slots at a high radius of the turbine wheels. The high radius of the interstage seal may increase the interstage volume for cooling, as well as the surface areas of the turbine wheels for cooling. Further, the interstage seal may be removable to allow access to underlying components. For example, the interstage seal may slide axially in and out of a mounting position across one or more wheels.

Figure 1:
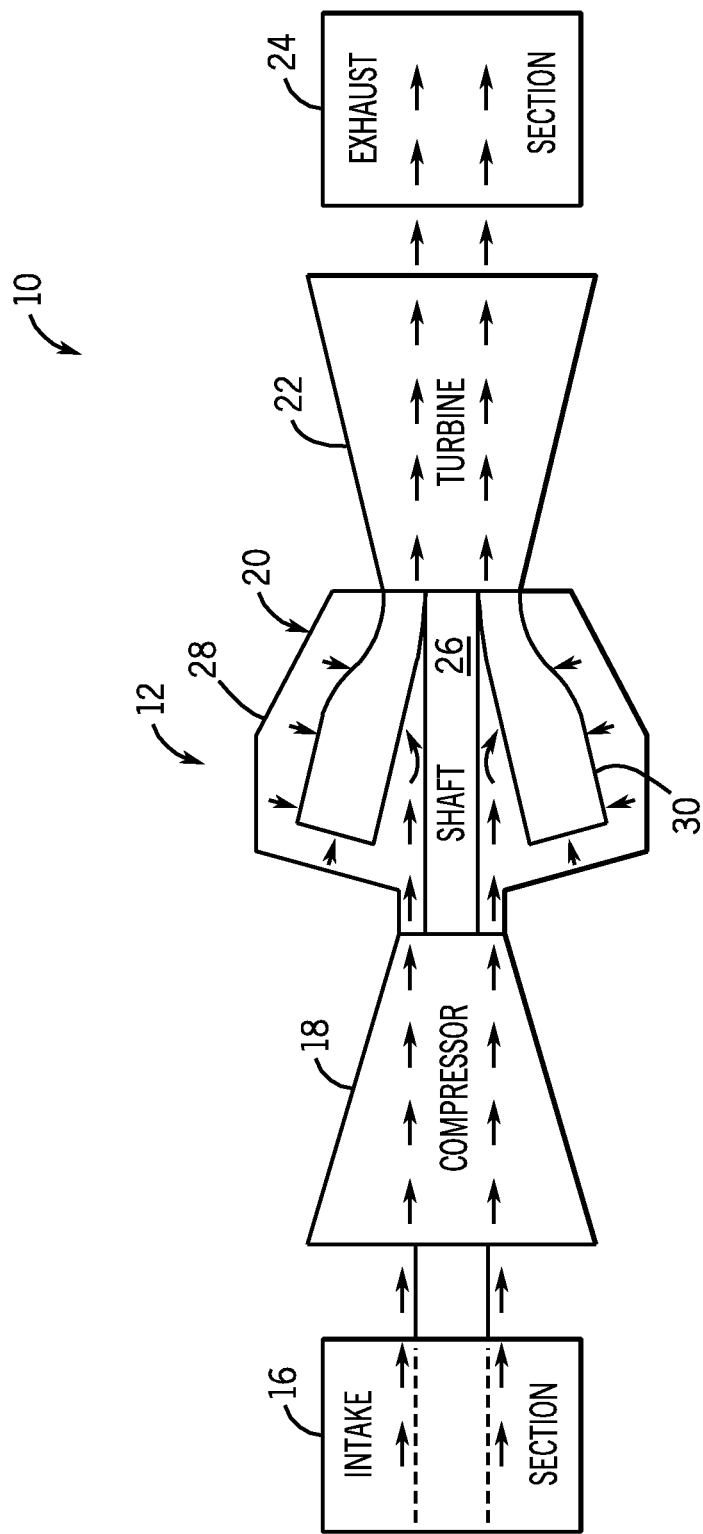
FIG. 1 is a schematic flow diagram of an embodiment of a gas turbine engine that may employ turbine seals.

FIG. 1 is a block diagram of an exemplary system 10 including a gas turbine engine 12 that may employ interstage seals with radial supports at adjacent wheels. In certain embodiments, the system 10 may include an aircraft, a watercraft, a locomotive, a power generation system, or combinations thereof. The illustrated gas turbine engine 12 includes an air intake section 16, a compressor 18, a combustor section 20, a turbine 22, and an exhaust section 24. The turbine 22 is coupled to the compressor 18 via a shaft 26.

As indicated by the arrows, air may enter the gas turbine engine 12 through the intake section 16 and flow into the compressor 18, which compresses the air prior to entry into the combustor section 20. The illustrated combustor section 20 includes a combustor housing 28 disposed concentrically or annularly about the shaft 26 between the compressor 18 and the turbine 22. The compressed air from the compressor 18 enters combustors 30 where the compressed air may mix and combust with fuel within the combustors 30 to drive the turbine 22.

From the combustor section 20, the hot combustion gases flow through the turbine 22, driving the compressor 18 via the shaft 26. For example, the combustion gases may apply motive forces to turbine rotor blades within the turbine 22 to rotate the shaft 26. As discussed below, the turbine 22 may include a plurality of interstage seals with radial supports at adjacent wheels. After flowing through the turbine 22, the hot combustion gases may exit the gas turbine engine 12 through the exhaust section 24.

Figure 2:
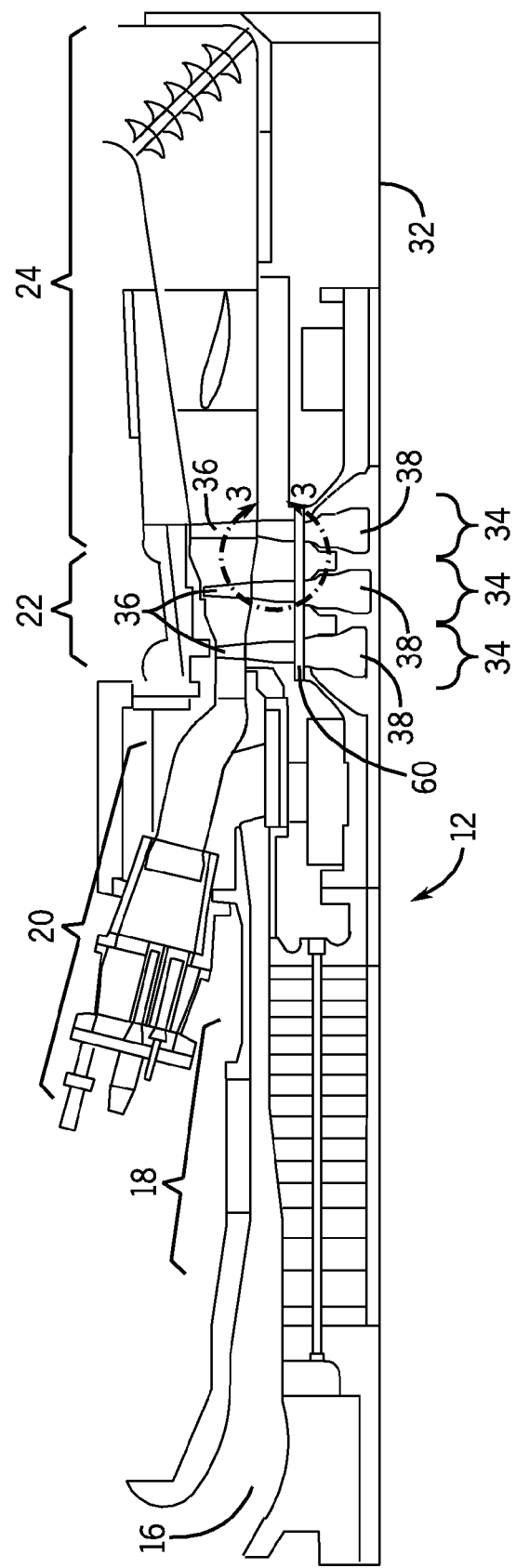
FIG. 2 is a cross-sectional side view of the gas turbine engine of FIG. 1 taken along the longitudinal axis.

FIG. 2 is a cross-sectional side view of an embodiment of the gas turbine engine 12 of FIG. 1 taken along the longitudinal axis 32. As depicted, the gas turbine 22 includes three separate stages 34. Each stage 34 includes a set of blades 36 coupled to a rotor wheel 38 that may be rotatably attached to the shaft 26 (FIG. 1). The blades 36 extend radially outward from the rotor wheels 38 and are partially disposed within the path of the hot combustion gases. Seals 60 extend between and are supported by adjacent rotor wheels 38. As discussed below, the seals 60 include radial supports that interface with adjacent wheels 38 to provide radial support, while also providing improved cooling and simple removal. Although the gas turbine 22 is illustrated as a three-stage turbine, the seals 60 described herein may be employed in any suitable type of turbine with any number of stages and shafts. For example, the seals 60 may be included in a single stage gas turbine, in a dual turbine system that includes a low-pressure turbine and a high-pressure turbine, or in a steam turbine. Further, the seals 60 described herein may also be employed in a rotary compressor, such as the compressor 18 illustrated in FIG. 1.

As described above with respect to FIG. 1, air enters through the air intake section 16 and is compressed by the compressor 18. The compressed air from the compressor 18 is then directed into the combustor section 20 where the compressed air is mixed with fuel. The mixture of compressed air and fuel is generally burned within the combustor section 20 to generate high-temperature, high-pressure combustion gases, which are used to generate torque within the turbine 22. Specifically, the combustion gases apply motive forces to the blades 36 to turn the wheels 38. In certain embodiments, a pressure drop may occur at each stage of the turbine, which may allow gas flow through unintended paths. For example, the hot combustion gases may flow into the interstage volume between turbine wheels 38, which may place thermal stresses on the turbine components. In certain embodiments, the interstage volume may be cooled by discharge air bled from the compressor or provided by another source. However, flow of hot combustion gases into the interstage volume may abate the cooling effects. Accordingly, the seals may be disposed between adjacent wheels 38 at a high radius to seal and enclose the interstage volume from the hot combustion gases.

Figure 3:
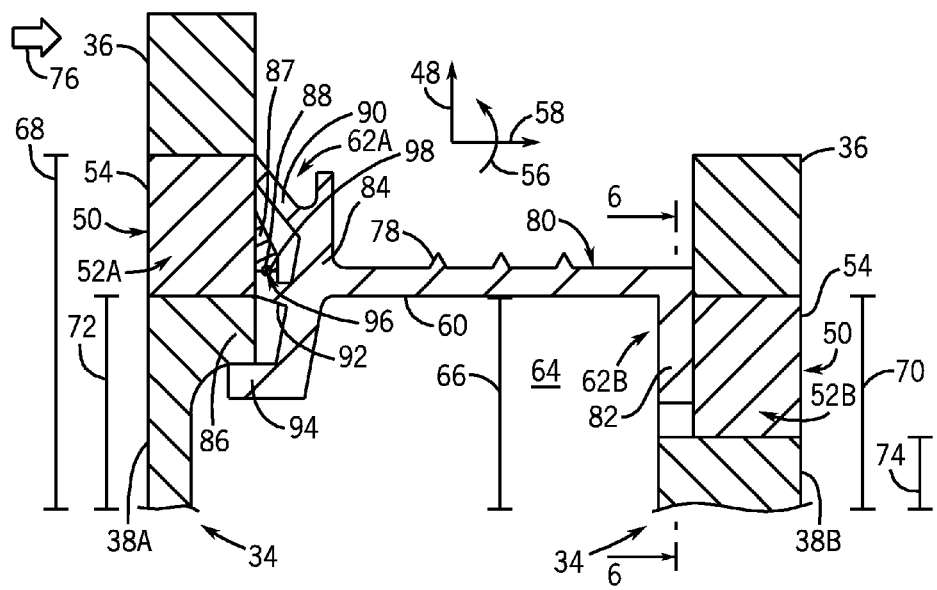
FIG. 3 is a partial cross-sectional side view of the gas turbine engine of FIG. 2 illustrating an embodiment of a seal structure between turbine stages.

FIG. 3 is a cross-sectional side view of a pair of adjacent rotor stages 34 shown in FIG. 2. For illustrative purposes, only a portion of the stages 34 are illustrated. However, the stages 34 generally include circular wheels 38 with blades 36 extending radially outward (in the direction indicated by arrow 48) from a wheel post portion 50 of the wheels 38. The wheel post portion 50 is disposed along the circumference of the wheels 38 and includes slots 52 (e.g., dovetail slots) for retaining lower segments 54 of the blades 36. In certain embodiments, approximately 50 to 150 blades 36 may be mounted and spaced circumferentially around (in the direction indicated by arrow 56) the wheels 38 and a corresponding axis of rotation (extending generally in the direction indicated by arrow 58).

A seal structure 60 extends between the two adjacent wheels 38A and 38B and is mechanically supported by the wheels 38. The seal structure 60 is annularly disposed (in circumferential direction 56) as a single piece between the wheels 38 and is attached to the wheels 38 via radial supports 62. Each wheel 38 forms an annular structure with the seal structure 60 extending as an annular structure between the wheels 38. During operation, the wheels 38 and the seal structure 60 rotate about a common axis. In certain embodiments, the seal structure 60 may interface with the wheels 38 at or near the same radial location (extending in direction 48) as the circumferentially spaced slots 52 within the wheels 38 that retain the blades 36. The seal structure 60 may include a 360-degree circular structure that attaches to adjacent wheels 38 to form a wall that thermally isolates an interstage volume or wheel cavity 64 that forms an air cooling chamber.

The interstage volume 64 receives discharge air bled from the compressor 18 to cool the interstage volume 64 and adjacent turbine components, such as the wheels 38. To promote cooling, the volume 64 is designed to be as large as possible, and therefore, the seal structure 60 is attached to the outermost portion of the wheels 38 or the wheel post portions 50 when forming the wall. Specifically, regions for attachment of the seal structure 60 are disposed on the radially outward (direction 48) sections of the wheels 38. The location of the seal structure 60 towards the radial outer section (direction 48) of the wheels 38 or the wheel post portions 50 increases or maximizes the interstage volume 64 to facilitate cooling within the volume 64. More specifically, the wall formed by the seal structure 60 has an inner radius 66. The slots 52A and 52B each include upper radii 68 and 70, respectively, as well as lower radii, 72 and 74, respectively. The inner radius 66 of the seal structure's wall may be greater than or equal to both the lower 74 and upper radii 70 of slot 52B. In addition, the wall's inner radius 66 may be greater than or equal to at least one of the lower 72 and upper radii 68 of slot 52A. The increased size of the interstage volume 64 and corresponding cooling capacity, due to the high inner radius 66 of the seal structure 60, may allow lower strength material to be used for the wheels 38. Cooling also may be promoted because there is no radial division within the interstage volume. Specifically, within the radial direction 48, the volume 64 is a continuous space. Further, the cooling air may provide greater convective cooling due to the greater surface area along the wheels 38.

The seal structure 60 may interface with stationary stator vanes (not shown) to direct the flow of hot fluids, such as hot combustion gases or steam, with a flow path 76 (illustrated generally by an arrow) disposed above the wheels 38 that passes through the blades 36. Specifically, the stator vane structure may include a seal surface that interfaces with seal teeth 78 located on the outer surface 80 of the seal structure 60. In certain embodiments, labyrinth seals may be formed between the seal surface material and the seal teeth 78. However, in other embodiments, any type of seal may be formed. The seal teeth 78 may be positioned radially outward (direction 48) from the seal structure 60. The location of the seal structure 60 towards the radial outer section (direction 48) of the wheels 38 or the wheel post portions 50 may allow the seal structure 60 to have a large sealing radius and to minimize the radial height of the stator vane structure. The minimized radial height may reduce the axial facing surface area of the stator vane structure, as well as the axial gas bending loads that may cause the stator vane structure to shift position.

As mentioned above, the seal structure 60 includes radial supports 62 to attach the structure 60 to the wheels 38. The radial supports 62 provide both radial and axial support to the seal structure 60. A first radial support 62B includes radial support protrusions 82. In some embodiments, both the first radial support 62B and a second radial support 62A of the seal structure 60 include radial support protrusions 82 (see FIG. 7). The radial support protrusions 82 of the first radial support 62B are disposed in slot 52B to block movement of the radial support protrusions 82, and thus the seal structure 60, in radial direction 48. The radial support protrusions 82 of the first radial support 62B may include dovetail protrusions 82. The dovetail protrusions 82 may then be disposed in dovetail slots 52B to block movement of the dovetail protrusions 82 in radial direction 48. The lower segments 54 of blades 36 are also disposed in slots 52B, and, thus, block movement of radial support protrusions 82 in axial direction 58.

The second radial support 62A includes axial support protrusions 84. The axial support protrusions 84 of the second radial support 62A may contact radial abutments of wheel 38A providing axial and radial support to the seal structure 60. The radial abutments may include a rim 86 of the wheel 38A, axial protrusions 87 with rope seal grooves 88 of the wheel post portion 50, and axial protrusions 95 of the blades 36 (see FIG. 4). The axial support protrusions 84 of the second radial support 62A may include a cover plate portion 90, rope seal groove interacting portions 92, and rim interacting portions 94. The cover plate portion 90 interacts with both the wheel post portion 50 and the lower segments 54 of the blades 36. The rope seal groove interacting portions 92 may interface with rope seal grooves 88 of the axial protrusions 87 to form a passage 96 for a rope seal 98. The blades 36 may also include axial protrusions 95 with rope seal grooves 99 (see FIG. 4). The rope seal grooves 99 of the blades 36 and the rope seal grooves 88 of the wheel post portion 50 may circumferentially extend 360 degrees in direction 56 around the wheel 38A and along with the rope seal 98 minimize leakage from the stationary components of the engine. In some embodiments, the blades 36 and the axial protrusions 87 of the wheel post portion 50 may also include retention slots. The retention slots of the blades 36 and the retention slots of the wheel post portion 50 may circumferentially extend 360 degrees in direction 56 around the wheel 38A and along with a blade retention wire provide axial retention for the blades 36. The rim interacting portions 94 may interact with the rim 86 of the wheel 38A blocking movement of the axial support protrusion 84 of the second radial support 62A in radial direction 48. In some embodiments, the rim interacting portions 94 may form rabbeted connections with the rim 86 of wheel 38A.

Figure 4:
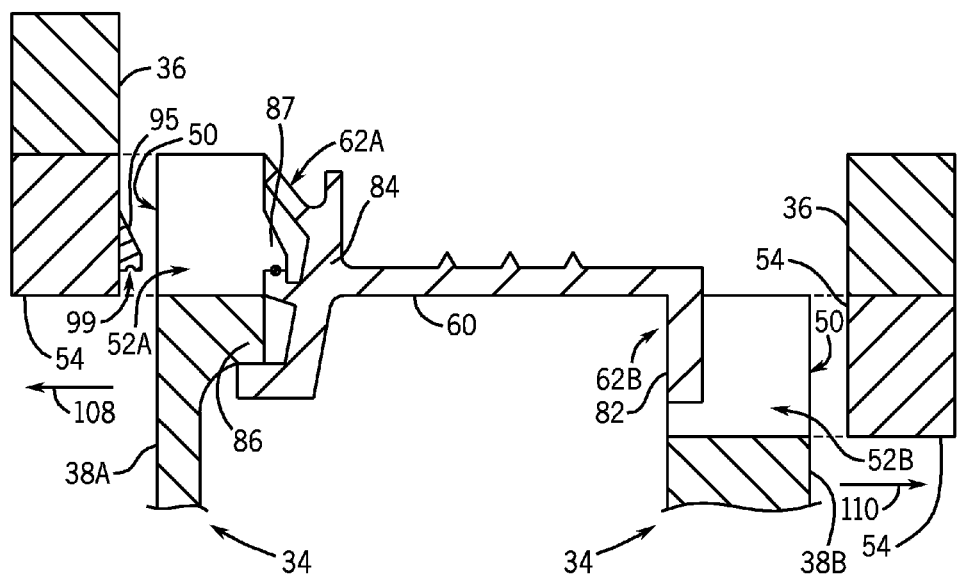
FIG. 4 is a partial cross-sectional side view of the gas turbine engine of FIG. 2 with blades being removed from adjacent stages.

FIG. 4 illustrates the installation of the seal structure 60 between the turbine stages 34. FIG. 4 is a cross-sectional side view of the pair of adjacent turbine stages 34. During maintenance or other disassembly processes, the blades 36 may be removed from slots 52A in an axial direction 108 or from slots 52B in an axial direction 110. During installation, the seal structure 60 may slide axially over wheel 38B into position between wheels 38A and 38B while the blades 36 are removed. The seal structure 60 may slide in axial direction 108 over the wheel 38B while the radial support protrusions 82 of the first radial support 62B slide in the same direction 108 through slots 52B. During this movement, both support protrusions 82 and 84 of the first and second radial supports 62B and 62A, respectively, may align with and slide through slots 52B. The seal structure 60 axially slides until the axial support protrusion 84 of the second radial support 62A contacts radial abutments 86 and 87 of the wheel 38A or wheel support post 50, as described above, to form the interstage seal. The radial abutments 86 and 87 block further movement of the seal structure 60 in axial direction 108. The blades 36 may be reinserted into slots 52A and 52B where the lower segments 54 of the blades 36 inserted in slots 52B block movement of the radial support protrusions 82 of the first radial support 62B in axial direction 110. Further, upon reinserting the blades 36, the axial support protrusion 84 of the second radial support 62A contacts the radial abutment 95 of the wheel 38A to form the interstage seal.

FIG. 5 illustrates the removal of the seal structure 60 from the pair of adjacent turbine stages 34. With the blades 36 removed from the slots 52A and 52B, the seal structure 60 may slide in axial direction 110 to remove the radial support protrusions 82 of the first radial support 62B from slots 52B. During this removal, both support protrusions 82 and 84 of the first and second radial supports 62B and 62A, respectively, may align with and slide through slots 52B. In embodiments with radial support protrusions 82 of the first radial support 62B on one end of the seal structure 60, as illustrated in FIG. 5, only the blades 36 in slots 52B need to be removed for the removal of the seal structure 60 in axial direction 110. The removal of the seal structure 60 provides access to components normally underlying the seal structure 60 without disassembly of other components of the turbine 22.

FIG. 6 is a partial cross-sectional view of an embodiment of the seal structure 60 with multiple radial support protrusions 82 of the first radial support 62B inserted in slots 52B of the wheel 38B, taken along line 6-6 of FIG. 3. The wheel post portion 50 of wheel 38B includes multiple protrusions 118 that extend radially outward from the wheel 38B. The protrusions 118 are circumferentially spaced around the wheel 38B to form circumferentially spaced slots 52B. The slots 52B may be dovetail slots 52B. The slots 52B formed by the spaced protrusions 118 may include a wavy, curving, or generally non-linear surface 119 defined by multiple peaks and dips. For example, the surface 119 may include tabs or tangs 120. The radial support protrusions 82 of the first radial support 62B of the seal structure 60 are circumferentially offset from each other and inserted within the slots 52B. The radial support protrusions 82 of the first radial support 62B may be dovetail protrusions 82. Similar to the slots 52B, the dovetail protrusions 82 may include a wavy, curving, or generally non-linear surface 121 defined by multiple peaks and dips. For example, the dovetail protrusions 82 may include tangs 122 that insert between the tangs 120 of the dovetails slots 52B. The protrusions 82 of first radial support 62B may extend completely or only partially into slots 52B in radial direction 124 leaving a gap between the protrusions 82 and the wheel 38B. This gap allows further cooling of the wheel 38B and the wheel post 50. The interaction between tangs 120 and 122 may block radial support protrusions 82 of the first radial support 62B from being displaced in radial direction 126. In other words, tangs 120 and 122 do not permit radial movement of the seal structure 60 at the wheel 38B. In addition, the slots 52B block the movement of the protrusions 82 of the first radial support 62B in circumferential direction 128. As partially illustrated, the seal structure 60 forms a single annular piece that extends circumferentially across multiple slots 52B and may extend 360 degrees across all of slots 52B. For example, the seal structure 60 may extend across 2 to 50, 2 to 25, 2 to 10, or 2 to 5 slots.

As mentioned above, both the first and second radial supports 62B and 62A of the seal structure 60 may each include multiple radial support protrusions 82. FIG. 7 illustrates an embodiment with seal structure 60 that includes first radial support protrusions of 82B of the first radial support 62B and second radial support protrusions 82A of the second radial support 62A disposed in slots 52B and 52A of wheels 38B and 38A, respectively. Insertion of the first and second protrusions 82B and 82A of the first and second radial supports 62B and 62A, respectively, into slots 52B and 52A blocks movement of the seal structure 60 in the radial direction indicated by arrows 138 and 144. The lower segments 54 of blades 36 are disposed in slots 52A and 52B to block the movement of radial support protrusions 82A and 82B in axial directions 140 and 142, respectively. The radial support protrusions 82A and 82B of the second and first radial supports 62A and 62B, respectively, may include dovetail protrusions 82 and the slots 52A and 52B may include dovetail slots 52, as described in FIG. 6. The dovetail protrusions 82A may be oriented in direction 138 which is opposite from orientation direction 144 of dovetail protrusions 82B. In embodiments where both the radial support protrusions 82A and 82B include dovetail protrusions 82, the seal structure 60 extends circumferentially across at least two of slots 52A and at least two of slots 52B, as illustrated in FIG. 6, and the seal structure 60 may extend circumferentially across all of slots 52A and 52B to form the wall between wheels 38A and 38B.

Figure 8:
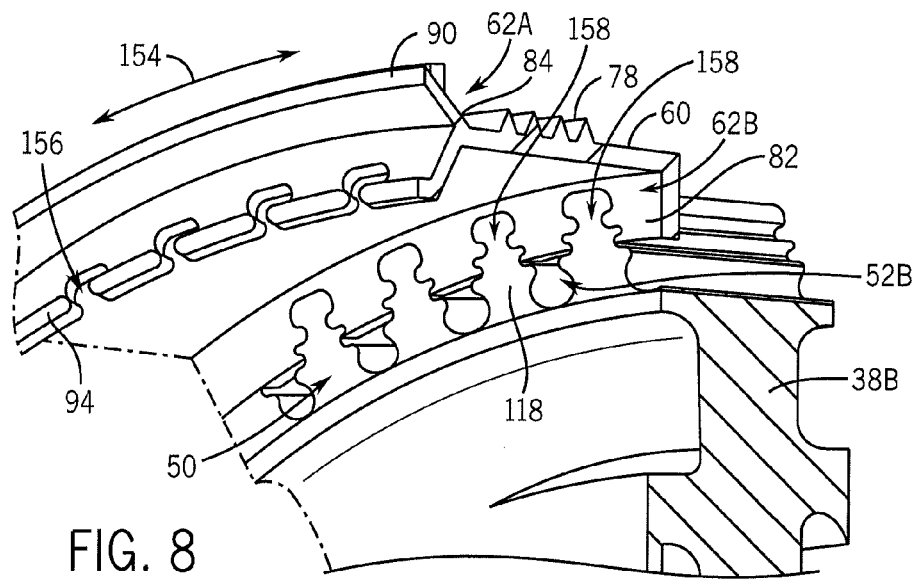
FIG. 8 is a partial perspective view of an embodiment of the seal structure inserted into slots of the wheel.

FIG. 8 is a partial perspective view of an embodiment of the seal structure 60 inserted into slots 52B of the wheel 38B. The one-piece seal structure 60 illustrated in FIG. 8 includes seal teeth 78, the first radial support 62B with radial support protrusions 82, and the second radial support 62A with axial support protrusions 84. The seal teeth 78 may extend circumferentially 360 degrees in direction 154 and interact with stator vane structures, as described above. The axial support protrusions 84 of the second radial support 62A include cover plate portion 90 and rim interacting portions 94. The cover plate portion 90 may continuously extend circumferentially 360 degrees in direction 154 and interact with lower segments 54 of blades 36 or wheel post portion 50. The rim interacting portions 94 may be offset from each other by gaps 156. These gaps 156 are in alignment with protrusions 118 of wheel 38B and spaces between the radial support protrusions 82 of the first radial support 62B occupied by protrusions 118. The gaps 156 may be shaped similar to top portions 158 of protrusions 118 facilitating the alignment of support protrusions 82 and 84 with slots 52B and, thus, allowing the rim interacting portion 94 of axial support protrusions 84 of the second radial support 62A to axially slide through slots 52B. The radial support protrusions 82 of the first radial support 62B may include dovetail protrusions 82 as described in FIG. 6. The protrusions 82 may be disposed in slots 52B allowing the seal to extend circumferentially across at least two of slots 52B. The slots 52B may include dovetail slots 52B.

Figure 9:
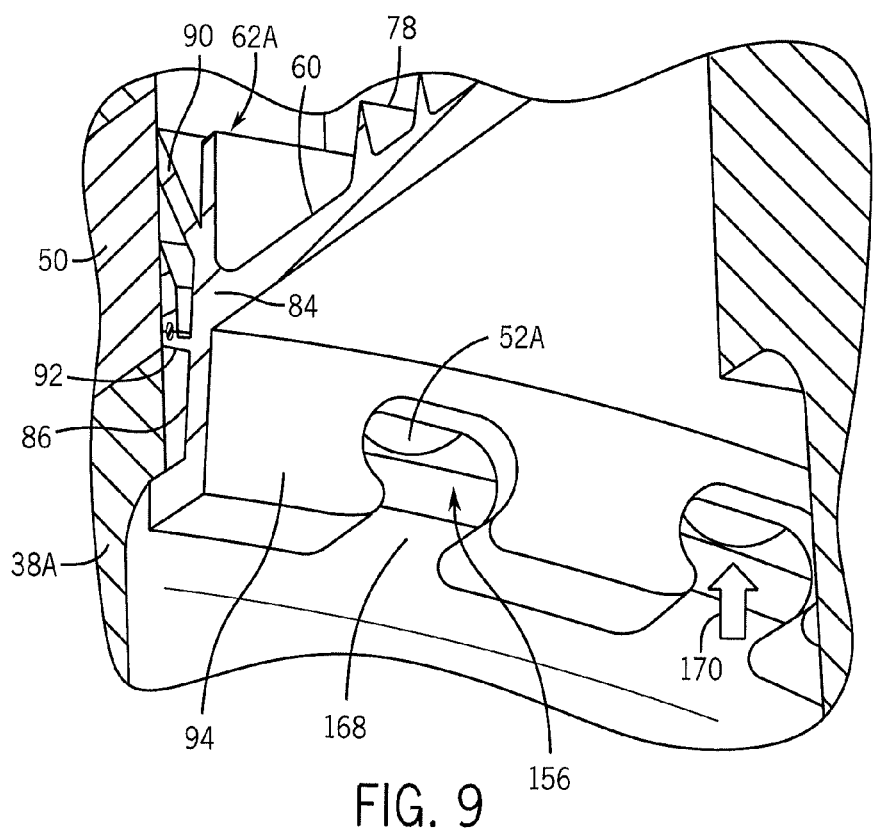
FIG. 9 is a partial perspective view of an embodiment of an axial support protrusion engaging the wheel.

FIG. 9 is a partial perspective view of an embodiment of the seal structure 60 abutting the wheel 38A and wheel post portion 50. The seal structure 60 illustrated in FIG. 9 includes seal teeth 78 and the second radial support 62A with axial support protrusions 84. The axial support protrusions 84 of the second radial support 62A include cover plate portion 90, rope seal groove interacting portion 92, and rim interacting portions 94. The cover plate portion 90 and rope seal interacting portions 92 function as described above. The rim interacting portions 94 interface with an underside 168 of the rim 86 of wheel 38A. The gaps 156 between the rim interacting portions 94 provide access to cooling air 170 from the interstage volume 64. The cooling air 170 allows the cooling of the upper portion of the wheel 38A, the wheel post 50, and the lower segments 54 of the blades 36. As mentioned above, this cooling allows lower strength material to be used for the wheels 38.

The radial supports 62 of the seal structure 60 described in the embodiments above both provide both axial and radial support via attachment to the wheels 38, thus allowing the use of a lighter structure 60. Also, the attachment of these radial supports 62 at a high radius of the wheels 38 exposes a greater surface area of the wheels 38 to the cooling air of the interstage volume 64 allowing the use of a lower strength material for the wheels 38. This high radial location of the seal structure 60 also allows the size of the diaphragm to be reduced. Further, the design of the radial supports 62 allows the removal of the seal structure 60 axially through the slots 52 for the blades 36 without having to unstack or disassemble the rotor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system, comprising:
 a multi-stage turbine, comprising:
  a first turbine stage comprising a first wheel having a plurality of first slots spaced circumferentially about the first wheel, and a plurality of first blade segments each coupled to at least one of the first slots;

a second turbine stage comprising a second wheel having a plurality of second slots spaced circumferentially about the second wheel, and a plurality of second blade segments each coupled to at least one of the second slots;

a one-piece interstage seal extending axially between the first and second turbine stages, wherein the one-piece interstage seal comprises a first radial support coupled to the first wheel and a second radial support coupled to the second wheel, and the one-piece interstage seal extends circumferentially across at least two of the plurality of first slots or at least two of the plurality of second slots, wherein the plurality of first slots comprises a first lower radius and a first upper radius, the plurality of second slots comprises a second lower radius and a second upper radius, the one-piece interstage seal comprises a wall extending between the first and second turbine stages, the wall has an inner radius, wherein the inner radius along the entire length of an innermost portion of the wall between the first and second radial supports is greater than the first lower radius and greater than or equal to the second lower radius, and the inner radius along the entire length of the innermost portion of the wall between the first and second radial support is greater than or equal to the first upper radius and less than the second upper radius.

2. The system of claim 1, wherein the one-piece interstage seal is a one-piece annular seal extending circumferentially across all of the plurality of first slots and all of the plurality of second slots.

3. The system of claim 1, wherein the first radial support comprises a plurality of first radial support protrusions, and each first radial support protrusion is disposed in one of the plurality of first slots to block movement of the one-piece interstage seal in a radial direction.

4. The system of claim 3, wherein each first radial support protrusion comprises a first dovetail protrusion, and each of the plurality of first slots comprises a dovetail slot.

5. The system of claim 3, wherein each first blade segment is disposed in one of the plurality of first slots to block movement of one of the first radial support protrusions in an axial direction.

6. The system of claim 5, wherein the one-piece interstage seal is configured to move in the axial direction over the first wheel while the plurality of first blade segments are removed from the plurality of first slots, and each first radial support protrusion is configured to move in the axial direction through one of the plurality of first slots during movement of the one-piece interstage seal in the axial direction.

7. The system of claim 3, wherein the second radial support comprises a plurality of second radial support protrusions, and each second radial support protrusion is disposed in one of the plurality of second slots to block movement of the one-piece interstage seal in the radial direction.

8. The system of claim 3, wherein the second radial support comprises at least one axial support protrusion configured to contact a radial abutment of the second wheel to block movement of the one-piece interstage seal in the radial direction.

9. The system of claim 1, comprising a gas turbine engine having the multi-stage turbine, at least one combustor, and at least one compressor stage.

10. A system, comprising:
a one-piece interstage turbine seal configured to mount axially between first and second turbine stages, wherein the one-piece interstage turbine seal comprises a first radial support configured to couple with a first wheel of the first turbine stage and a second radial support configured to couple with a second wheel of the second turbine stage, the first radial support comprises a plurality of first radial support protrusions circumferentially offset from one another, and each first radial support protrusion is configured to couple with one of a plurality of first slots in the first wheel to block movement of the one-piece interstage turbine seal in a radial direction, wherein the one-piece interstage turbine seal comprises a wall configured to extend between the first and second turbine stages, the wall has an inner radius, wherein the inner radius along the entire length of an innermost portion of the wall between the first and second radial supports is greater than a first lower radius of the plurality of first slots in the first wheel and greater than or equal to a second lower radius of a plurality of second slots in the second wheel, and the inner radius along the entire length of the innermost portion of the wall between the first and second radial support is greater than or equal to a first upper radius of the plurality of first slots in the first wheel and less than a second upper radius of the plurality of second slots in the second wheel.

11. The system of claim 10, wherein the one-piece interstage turbine seal is a one-piece annular seal configured to extend circumferentially across all of the plurality of first slots.

12. The system of claim 10, wherein each first radial support protrusion comprises a first dovetail protrusion, and each first slot comprises a dovetail slot.

13. The system of claim 10, wherein the second radial support comprises a plurality of second radial support protrusions circumferentially offset from one another, and each second radial support protrusion is configured to couple with one of a plurality of second slots in the second wheel to block movement of the one-piece interstage turbine seal in the radial direction.

14. The system of claim 10, wherein the second radial support comprises at least one axial support protrusion configured to contact a radial abutment of the second wheel to block movement of the one-piece interstage turbine seal in the radial direction.

15. A system comprising:
a multi-stage turbine, comprising:
a first turbine stage comprising a first wheel having a plurality of first slots spaced circumferentially about the first wheel, and a plurality of first blade segments each coupled to at least one of the plurality of first slots, wherein the plurality of first slots comprises a first lower radius and a first upper radius;
a second turbine stage comprising a second wheel having a plurality of second slots spaced circumferentially about the second wheel, and a plurality of second blade segments each coupled to at least one of the plurality of second slots, wherein the plurality of second slots comprises a second lower radius and a second upper radius;
an interstage seal extending axially between the first and second turbine stages, wherein the interstage seal comprises a first radial support coupled to the first wheel, a second radial support coupled to the second wheel, and a wall extending between the first and second turbine stages, the wall has an inner radius, wherein the inner radius along the entire length of an innermost portion of the wall between the first and second radial supports is greater than the first lower radius and greater than or equal to the second lower radius, and the inner radius along the entire length of the innermost portion of the wall between the first and second radial supports is greater than or equal to the first upper radius and less than the second upper radius.

16. The system of claim 15, wherein the interstage seal extends circumferentially across at least two of the plurality of first slots or at least two of the plurality of second slots.

17. The system of claim 1, wherein first radial support extends in a first radial direction relative to the rotational axis, and at least the portion of the second radial support extends in a second radial direction opposite the first radial direction.

18. The system of claim 15, wherein first radial support extends in a first radial direction relative to a rotational axis of the first and second wheels, and at least a portion of the second radial support extends in a second radial direction opposite the first radial direction.

* * * * *